Feb. 17, 1931.  E. C. MANDERFELD  1,792,650
REGULATOR SYSTEM
Filed Dec. 19, 1929
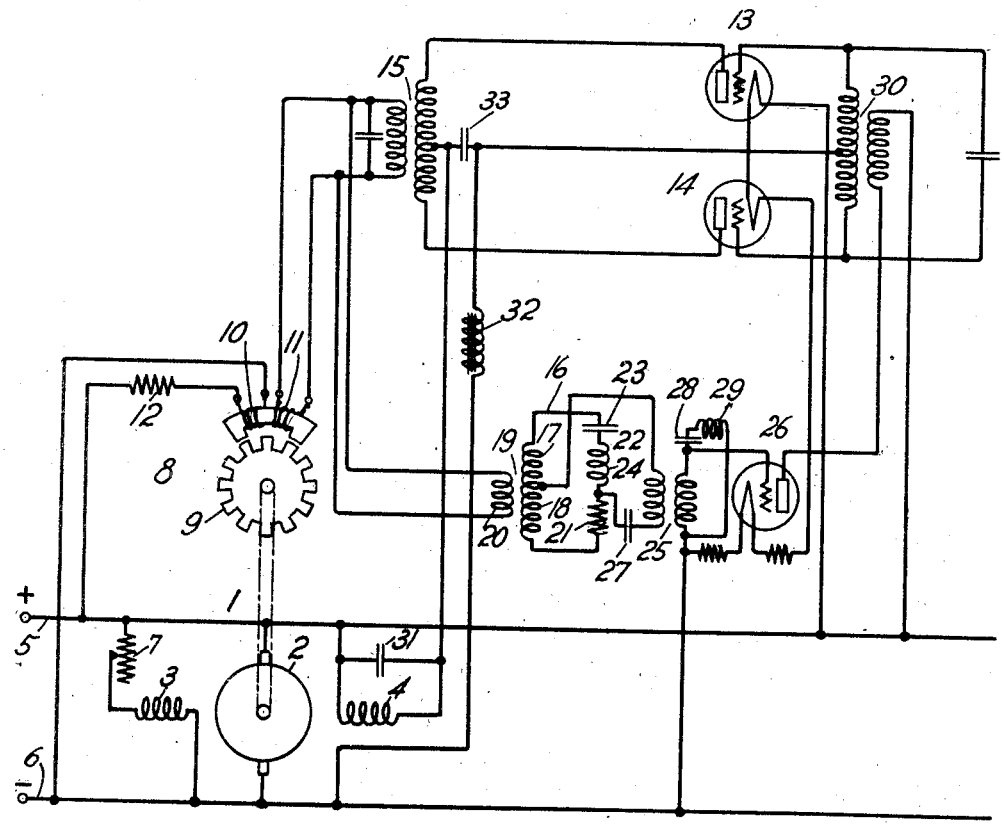
INVENTOR
E.C. MANDERFELD
BY
Wayne B Wells
ATTORNEY Patented Feb. 17, 1931

1,792,650

UNITED STATES PATENT OFFICE

EMANUEL C. MANDERFELD, OF BOONTON, NEW JERSEY, ASSIGNOR TO BELL TELEPHONE LABORATORIES, INCORPORATED, OF NEW YORK, N. Y., A CORPORATION OF NEW YORK

REGULATOR SYSTEM

Application filed December 19, 1929. Serial No. 415,212.

This invention relates to regulator systems and particularly to stablizing means in regulator systems employing space discharge devices to control a characteristic of a dynamo-electric machine.

One object of the invention is to provide a regulator system for maintaining a characteristic of a dynamo-electric machine constant that shall employ improved means operated according to the rate of change of the machine characteristic for stabilizing the regulating operation.

Another object of the invention is to provide a regulator system having a space discharge device for maintaining the characteristic of a circuit constant that shall employ improved means operated according to the rate of change in the characteristic of the circuit for governing the space discharge device to stabilize the regulating operation.

A further object of the invention is to provide a regulator system having a space discharge device for maintaining the speed of a motor constant that shall employ capacity means reacting on the device according to the rate of change of the motor speed to stabilize the regulating operation.

In operating a sensitive regulator system to obtain precision regulation of a circuit or a dynamo-electric machine the so-called hunting takes place unless provision is made to stabilize the regulating operation. In the present invention the regulating operation is stabilized by a force proportional to the rate of change in a characteristic of the circuit or the machine under regulation.

The system employed to disclose the invention is similar in some respects to the regulator system disclosed in the H. M. Stoller Patent No. 1,695,035 dated December 11, 1928. In the system disclosed in the Stoller Patent No. 1,695,035 hunting is prevented by the means disclosed in the H. M. Stoller et al. Patent No. 1,662,083 dated March 13, 1928.

In the present invention a capacity element is provided in a speed regulator system for a motor to impress a potential on the grid of a space discharge detector tube that is proportional to the rate of change of the motor speed to stabilize the regulating operation and prevent hunting action. A capacity element for performing the above function is efficient at low frequency changes and is not affected by steady direct currents in the circuit to which it is connected.

In the system employed to disclose the invention a regulator under the control of a pilot generator governs the excitation of a direct current motor to maintain the speed of the motor substantially constant. The pilot generator is operated by the motor to develop an alternating current having a frequency varying according to the speed of the motor. A Wheatstone bridge circuit having one arm thereof in the form of a resonance circuit tuned to the frequency of the generator when the motor is operated at normal speed has two opposite vertices thereof connected to the pilot generator. The other vertices of the Wheatstone bridge circuit are connected through an amplifier to the input circuits of two phase-detector space-discharge devices connected in push-pull relationship to each other. Plate potential for the two phase-detector tubes connected in push-pull relationship is supplied by the pilot generator. The phase relation of the current impressed upon the grids of the phase-detector tubes is varied by the Wheatstone bridge circuit according to the frequency of the pilot generator. Consequently, the phase relation between the potentials impressed upon the grids and the plates of the phase-detector tubes varies in accordance with the frequency of the pilot generator and in accordance with the speed of the motor. The motor is provided with a regulating field in the output circuits of the phase-detector tubes which is varied in a manner to maintain the motor speed substantially constant.

In order to stabilize the regulating operation and prevent the so-called hunting action, a capacity element is connected between the output circuits and the input circuits of the phase-detector tubes to so control the phase-detector tubes as to prevent hunting action. The condenser connected between the output and the input circuits of the phase-detector tubes is efficient at low frequency changes and is unaffected by the absolute value of the direct current supplied to the regulating field winding of the motor. If the space current supplied to the regulating field of the motor starts to change in either direction, the condenser impresses a potential on the grids of the phase-detector tubes to oppose such change in the output circuits of the phase-detector tubes.

The single figure in the accompanying drawing is a diagrammatic view of a regulator system constructed in accordance with the invention.

Referring to the drawing a motor 1 comprising an armature 2, a shunt field winding 3 and a regulating field winding 4 is connected across a supply circuit comprising conductors 5 and 6. An adjustable resistance element 7 is provided in the circuit of the shunt field winding 3 for controlling the speed of the motor at will.

A pilot generator 8 comprising an inductor rotor 9, a field winding 10 and an armature winding 11 is directly operated by the motor 1 to produce an alternating current having a frequency varying according to the motor speed. The field winding 10 is connected across the direct current supply conductors 5 and 6 in series with a resistance element 12. The pilot generator 8 supplies plate potential to two phase-detector space-discharge devices 13 and 14 by means of a transformer 15.

The pilot generator 8 also supplies current to a Wheatstone bridge circuit 16. The Wheatstone bridge circuit comprises two inductive arms 17 and 18 which form the secondary winding of a transformer 19. The primary winding 20 of the transformer is directly connected to the pilot generator 8. The Wheatstone bridge circuit also comprises a resistance arm 21 and an arm 22 in the form of a resonant circuit. The resonant circuit arm 22 comprises a capacity element 23 and an inductive element 24. The transformer 19 connecting the bridge circuit to the pilot generator in effect connects the pilot generator to two opposite vertices of the Wheatstone bridge circuit.

The other two vertices of the Wheatstone bridge circuit are connected by a transformer 25 to the input circuit of a thermionic amplifier tube 26. A condenser 27 is placed in the connection between the Wheatstone bridge circuit and the transformer 25 for shifting the phase of the current from the bridge circuit for a purpose to be mentioned hereinafter. A condenser 28 and an inductance coil 29 are provided in the input circuit of the amplifier tube 26 for by-passing harmonic frequencies produced by the pilot generator. Plate potential for the amplifier tube 26 is supplied from the conductors 5 and 6 and filament heating current is supplied from the conductors 5 and 6 in series with the filaments for the phase-detector tubes 13 and 14.

The output circuit of the amplifier tube 26 is connected by a transformer 30 to the phase-detector tubes 13 and 14. The phase-detector tubes 13 and 14 are connected in push-pull relationship and supply rectified current to the regulating field winding 4 of the motor 2. A condenser 31 is connected across the field winding 4 for smoothing out ripples in the rectified current. A negative grid bias for the phase-detector tubes 13 and 14 is supplied from the conductor 6 through a choke coil 32.

In the system above described, alternating plate potential is supplied by the pilot generator 8 to the phase-detector tubes 13 and 14. At the same time, the Wheatstone bridge circuit 16 impresses an alternating potential on the grids of the phase-detector tubes which varies in phase with respect to the alternating potential impressed upon the plates of the phase-detector tubes proportionate to the frequency of the current produced by the pilot generator. The frequency of the pilot generator varies according to the speed of the motor and accordingly the phase relation between the potentials impressed upon the plates and the grids of the phase-detector tubes varies according to the speed of the motor. The operation of the phase-detector tubes in controlling the excitation of the motor is more clearly set forth in the H. M. Stoller Patent No. 1,695,035 and a further description is deemed unnecessary. The condenser 27 which is inserted between the transformer 25 and the Wheatstone bridge circuit serves to correct the phase of the current supplied from the Wheatstone bridge circuit in order to obtain the best operation of the two phase-detector tubes.

Unless some stabilizing means is provided for a highly sensitive regulator system of the type above disclosed, the so-called hunting action will take place. In the present invention a condenser 33 is provided for impressing a potential on the grids of the phase-detector tubes which vary according to the rate of change in the motor speed or according to the rate of change of the current in the output circuits of the phase-detector tubes 13 and 14.

The condenser 33 is shown connected to a mid tap of the secondary winding of the transformer 15 and a mid tap of the secondary winding of the transformer 30. By providing a capacity element for impressing a stabilizing potential on the grids of the phase-detector tubes, it is apparent that efficient operation will take place even if the frequency of the changes operating on the capacity element is very low. Furthermore, a capacity element in the position shown in the drawing for effecting the stabilizing operation will be unaffected by a steady direct current. The condenser is independent of the absolute value of the space current for the phase-detector tubes. However, any change in such space current impresses a stabilizing potential on the grids of the phase-detector tubes. If the space current of the phase-detector tubes starts to vary in either direction, the condenser 33 impresses a potential on the grids of the phase-detector tubes in such a direction as to oppose the change being effected.

Modifications in the system and in the arrangement and location of parts may be made within the spirit and scope of the invention, and such modifications are intended to be covered by the appended claims.

What is claimed is:

1. In a regulator system, a dynamo-electric machine, a regulator comprising a detector responsive to variations in a characteristic of said machine, and means comprising a capacity element for impressing a potential on said detector proportional to the rate of change of said machine characteristic.

2. In a regulator system, a motor, a regulator comprising a space discharge device for controlling said motor to maintain the speed thereof substantially constant, and means comprising a capacity element for impressing a potential on said device proportional to the rate of change of the machine speed.

3. In a regulator system, a motor, a regulator comprising a three-element space discharge device for controlling said motor to maintain the speed thereof substantially constant, and means comprising a capacity element for impressing a potential on the grid of said device proportional to the rate of change of the device output to stabilize the regulating operation.

4. In a regulator system, a dynamo-electric machine, means comprising a space discharge device responsive to variations in a characteristic of said machine for controlling the machine to maintain the characteristic thereof constant, and means comprising a capacity element for impressing a potential on the device input circuit proportional to the rate of change of the current in the output circuit of the device.

5. In a regulator system, a dynamo-electric machine, means comprising a space discharge device for controlling said machine to maintain a characteristic thereof constant, and means comprising a capacity element for impressing an electromotive force on the device input circuit proportional to the rate of change of the current in the output circuit thereof to stabilize the regulating operation and prevent hunting action.

6. In a speed regulator system, a motor, a source of alternating current having the frequency thereof varying according to the speed of said motor, means comprising a phase-detector tube for controlling the speed of said motor, a Wheatstone bridge circuit connected to said source and having one arm thereof tuned to the frequency of said source when the motor is operating at normal speed, means for supplying said phase-detector tube with plate potential from said source and with grid potential from said bridge, and means comprising a capacity element connected between the output and input circuits of said detector tube for stabilizing the regulating operation.

7. In a regulator system, a motor, a source of alternating current having a frequency proportional to the motor speed, a Wheatstone bridge circuit having a resonant circuit in one arm thereof and having two opposite vertices thereof connected to said source of current, means comprising a phase-detector tube responsive to the phase relation of the current from said bridge with respect to the current from said source for controlling the motor speed, and means comprising a capacity element for impressing an electromotive force, on said tube proportional to the rate of change of the motor speed.

8. In a regulator system, a motor, a source of alternating current having a frequency varying according to the motor speed, a Wheatstone bridge circuit having a resonant arm tuned to the frequency of said source when the motor is operating at normal speed, two opposite vertices of said bridge being connected to the source of alternating current, means comprising a phase-detector tube connected to the other two bridge vertices for controlling the motor to maintain the speed thereof substantially constant, and means comprising a capacity element for impressing a potential on said tube proportional to the rate of change of the motor speed.

9. In a regulator system, a motor, a pilot generator operated by said motor to produce a current having a frequency varying according to the motor speed, a Wheatstone bridge circuit having one arm thereof in the form of a resonant circuit tuned to the frequency of said generator when the motor is operated at normal speed, a phase-detector tube operated according to the phase relation between the current from the bridge circuit and current from said generator, a motor regulating field operated by said detector tube for maintaining the motor speed substantially constant, and a condenser connected between the output circuit and the input circuit of said detector tube for stabilizing the regulating operation.

10. In a regulator system, a motor, a pilot generator operated by said motor to produce a current having a frequency varying according to the motor speed, a Wheatstone bridge having one arm thereof in the form of a resonant circuit tuned to the frequency of said generator when the motor is operating at normal speed, an amplifier connected to the other two vertices of said bridge, two phase-detector tubes connected in push-pull relationship, alternating plate potential being supplied to the detector tubes from said generator and the input circuits of the detector tubes being connected to said amplifier for operating the detector tubes according to the phase relation between the current from the bridge circuit and the current from the generator, a motor regulating field controlled by said detector tubes to maintain the motor speed substantially constant and a capacity element for impressing a potential on the input circuits of the detector tubes proportional to the rate of change of the current in the output circuits thereof to stabilize the regulating operation.

In witness whereof, I hereunto subscribe my name this 12th day of Dec., 1929.

EMANUEL C. MANDERFELD.